United States Patent Office 2,959,567
Patented Nov. 8, 1960

2,959,567

POLYETHYLENE STABILIZED WITH TETRA-ALKANOL SUBSTITUTED ETHYLENE DI-AMINES

Charles R. Pfeifer, Midland, Mich., assignor to The Dow Chemical Company, Midland, Mich., a corporation of Delaware No Drawing. Filed Jan. 26, 1956, Ser. No. 561,685

4 Claims. (Cl. 260—45.9)

This invention relates to improved, non-corrosive compositions comprised of select corrosion-inhibiting agents and polymerized olefinic and other ethylenically unsaturated materials which have been prepared with certain catalytic metal compounds. In particular it relates to compositions of this nature which are not promotive of oxidative corrosion of metals and other materials of construction, particularly ferrous metals and alloys that do not have special corrosion-resisting properties and that are susceptible to oxidative corrosion and formation of oxide films on their surfaces, especially at elevated temperatures. The invention also relates to a method for preparing such compositions.

Various olefins and other ethylenically unsaturated materials, particularly ethylene, may be efficiently polymerized, even as relatively impure materials, to high molecular weight polymeric compounds at comparatively low pressures and temperatures, according to a process first proposed by Karl Ziegler and his associates in Germany. In this process, mixtures of strong reducing agents such as aluminum alkyls with compounds of group IV–B, V–B and VI–B metals of the periodic system including thorium and uranium and employed as catalysts for the polymerization. Polyethylenes, for example, having average apparent molecular weights (as indicated by measurement of such characteristics as their melt viscosities and the like) in excess of 40,000 and as large as 100,000 to 3,000,000 can be manufactured by polymerizing ethylene gas with such catalyst at temperatures beneath about 100° C. and under pressures less than about 100 atmospheres. It is frequently preferable when employing such catalyst according to the Ziegler process to operate at temperatures of about 50° C. and under pressures between about 1 and 10 atmospheres. The reaction may suitably be conducted in the presence of an organic liquid medium such as hexane, benzene, saturated petroleum hydrocarbon fractions and the like.

The polyethylenes prepared by the Ziegler process have superior and highly desirable properties. For example, they may be made containing less than 3 and even less than 0.03 methyl groups per each 100 methylene groups in the polymer molecule. The polymer molecules are practically completely linear and are crystalline almost to their melting points, which usually are in the neighborhood of about 125–135° C. Their densities are commonly in the range of about 0.94–0.96 gram per cubic centimeter and higher. They are insoluble in most solvents at ordinary temperatures. Shaped articles formed with such polyethylenes have tear strengths between about 1400 and 2800 pounds per square inch. Unstretched films prepared from them have tensile strengths in excess of about 2800 pounds per square inch and may be oriented by stretching to polyethylene film structures having tensile strengths as high as about 42,500 pounds per square inch.

The strong reducing agents which advantageously are employed in the catalyst mixtures of the Ziegler process include, among other compounds, a variety of aluminum trialkyls such as aluminum trimethyl, aluminum triethyl, aluminum tripropyl, aluminum triisobutyl and higher aluminum trialkyls as well as dialkyl aluminum halides, dialkyl aluminum hydrides and dialkyl aluminum alkoxides. Salts of metals selected from the group consisting of titanium, zirconium, vanadium, uranium, thorium and chromium are preferably employed as the group IV–B, V–B and VI–B metallic compounds in the catalyst, although salts of the remaining metals in these sub-groups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in the catalyst.

A particularly active catalyst mixture for the Zeigler process may be obtained by mixing a titanium or zirconium compound, such as a tetrachloride, oxychloride or acetyl acetonate with an aluminum trialkyl or a dialkyl aluminum compound. Generally, the molar quantities of the aluminum alkyl employed to constitute the catalyst admixture are two to three times the valence of the group IV–B, V–B and VI–B metal compound for each mole of the latter compound which is present, although many other ratios may also be employed satisfactorily. Amounts of the catalyst admixture varying from 0.01 to a few percent by weight, depending on the degree of purity of the materials being polymerized, the desired rate of polymerization and the intended molecular weight, may suitably be employed.

After polymerization according to the Ziegler process, however, polyethylene and similar polymerized products contain residues from the admixed metallic catalyst employed. The residues are not sufficiently removed by the conventionally utilized aftertreatment of polymeric materials prepared according to the Zeigler process. Such aftertreatment usually involves filtration, preferably in the presence of air (which tends to lighten the color of the product), to separate the polymerization product from the reaction mass. This maybe followed by sequential trituration with hexane, isopropanol, water, acetone and pentane prior to drying. When higher catalyst concentrations are employed in the Ziegler process, some of the metallic compounds may be removed from the polymeric product by extracting it with methanolic hydrochloric acid, then washing it in methanol or acetone. Butanol washings after the filtration in air have also been proposed to decompose and remove the catalyst residue.

It has been observed that the presence of certain catalyst residues in polymeric materials prepared according to the Ziegler process tends to impart decidedly undesirable characteristics to the polymers. For example, such polymers, particularly when the catalyst residue contains halogens, especially chlorine, which may cause the presence of hydrogen halides or like corrodents in the polymer, tend not only to be extremely corrosive to most of the materials of construction commonly utilized in apparatus for extruding, shaping or molding the polymer, but are also accessorial to the relatively higher temperature oxidation of such materials. This is greatly pronounced in the frequent cases when the construction materials employed in such apparatus are particularly sensitive or susceptible to being oxidized at relatively higher temperatures and to form relatively heavy, blue-colored films on their surface. Such an effect may be delineated as a "blueing" of the surface of the construction material. Many of the frequently employed ferrous metals and alloys are susceptible to such corrosive attack, especially at elevated temperatures of about 180° C. and higher.

While, as disclosed in the copending applications having Serial Nos. 553,690, 553,721, 553,722, 553,729, and 553,746, all of which were filed on December 19, 1955, and in each of which the present applicant is an inventor, various substances may be employed to diminish the corrosive propensities of halogen-containing polymeric materials, particularly polyethylene, prepared according to the Ziegler process, by countereffecting the presence of or acting as receptors for hydrogen halides and the like which may be present or formed in the polymer, many of these substances are not effective to prevent the surface "blueing" or oxidative corrosion which is frequently experienced when molding such polymeric materials, especially at the relatively high temperatures which are benefically employed for fabricating Ziegler type polymeric materials, particularly polyethylene. Fabricating temperatures in excess of about 180–200° C. and frequently as high as 300 to 350° C. have been found advantageous for fabricating such polymers as polyethylene prepared according to the Ziegler process in order to obtain optimum physical properties in the fabricated polymeric article.

It would be advantageous, therefore, to provide compositions prepared with halogen-containing catalyst admixtures according to the Ziegler process and containing halogens in the catalyst residue which would not be promotive or accessorily contributive to the oxidation and surface "blueing" of materials employed in the fabrication of the polymers. It would be especially advantageous if such compositions did not promote or induce oxidation at elevated fabricating temperatures and if they could be utilized safely without formation of oxide films on the fabricating apparatus employed for the polymer.

These and other advantages and benefits may be realized according to the compositions provided by the present invention which are comprised of a polymerized olefinic and other ethylenically unsaturated material, particularly polyethylene, prepared with halogen-containing catalysts according to the herein described Ziegler process and containing halogen-including residues from the catalyst and an oxidative-corrosion-inhibiting quantity of an alkanol derivative of ethylene diamine, particularly N,N,N',N'-tetrakis-(2-hydroxypropyl - ) ethylenediamine which is capable of countereffecting the tendency of the polymeric material for promoting or inducing "blueing" or oxidative corrosion on fabricating apparatus. Generally the alkanol derivative of ethylene diamine may advantageously be employed in the composition in an amount between about 0.005 and 5 percent by weight, based on the weight of the composition. Frequently, in order to satisfactorily inhibit the oxidation inducing nature of many of the polymeric materials prepared according to the Ziegler process, an amount between about 0.5 and 2.0 percent by weight, based on the weight of the composition may be utilized. In all cases the relative amount of the alkanol derivative of ethylene diamine which will suitably inhibit oxidative corrosion can be predicated on the relative proportion of the halogen-including catalyst residue which remains in the polymer product and the degree of the residue's tendency to induce oxidative corrosion or "blueing." Consideration of these factors under the influence of elevated temperatures must also be involved whenever fabrication of the corrosion-inhibited polymer at such temperatures is contemplated.

Compositions according to the present invention show little or no tendency to oxidatively corrode or cause surface "blueing" upon apparatus which may be employed for their fabrication, even when such apparatus is constructed from such materials as mild steel and other frequently utilized ferrous metals and alloys having poor resistance to oxidative corrosion. The inhibition of oxidative corrosion of the apparatus is also advantageously obtained during fabrications at elevated temperatures. The compositions do not necessitate employing fabricating apparatus which is made from relatively more expensive materials of construction which have special corrosion-resisting characteristics and eliminate the expensive damage and waste which occurs when conventional apparatus is oxidatively corroded. In addition, better quality products may be obtained when the fabricating apparatus is kept free from the physical damage caused by oxidative corrosion.

In a series of illustrative examples, N,N,N',N'-tetrakis-(2-hydroxypropyl-) ethylene diamine was incorporated along with various corrosion-inhibiting compounds which have a receptor function for and are capable of countereffecting hydrogen halide and like corrodents in a relatively high molecular weight polyethylene which was prepared with an admixed aluminum alkyl-titanium tetrachloride catalyst according to the herein described Ziegler process. The polyethylene had a catalyst residue which contained between 0.02 and 0.08 percent by weight of chlorine, based on the weight of the polyethylene. For purposes of comparison the N,N,N',N'-tetrakis-(2-hydroxypropyl-) ethylenediamine was omitted in several of the samples. In each of the tests a small plate of mild steel (1″ x 1″ x ⅛″) having a finished surface was imbedded under compression molding within a particular polyethylene sample in order to form a steel-in-polymer matrix. Each of the test matrices was permitted to remain overnight in air before being examined. The test plates were then inspected for evidences of oxidative corrosion and particularly for formation of an oxide film. The color of the oxide film was an indication of its relative thickness and of the severity of oxidation, being a pale yellow in very thin films and assuming a bluish coloration with increased film thickness. The following table reproduces the results which were obtained with several of the corrosion-inhibited compounds and includes the compositions which were prepared without inclusion of any N,N,N',N'-tetrakis-(2-hydroxypropyl-) ethylenediamine. The N,N,N',N'-tetrakis-(2-hydroxypropyl-) ethylenediamine which was employed was similar to that which may be obtained under the trade-name "Quadrol" from Wyandotte Chemicals Co.

| Run | Hydrogen halide Corrosion Inhibitor | Percent by wt. of Corrosion Inhibitor For hydrogen halide corrodents | Percent by wt. of N,N,N',N'-tetrakis-(2-hydroxypropyl-) ethylenediamine | Oxide Film Color |
|---|---|---|---|---|
| A | Sodium Orthophosphate | 1.4 | None | Blue. |
| B | ......do............... | 1.4 | 0.5............... | Pale Yellow. |
| C | Barium pelargonate | 1.4 | 0.8............... | Do. |
| D | ......do............... | 1.4 | 1.1............... | None. |
| E | ......do............... | 1.4 | 1.4............... | Do. |
| F | ......do............... | 1.8 | None | Yellow. |
| G | ......do............... | 1.8 | 0.5............... | None. |
| H | ......do............... | 2.2 | None | Yellow. |
| I | ......do............... | 2.2 | 0.5............... | None. |
| J | Sodium orthophosphate | 5.0 | None | Blue. |
| K | ......do............... | 5.0 | 0.5............... | None. |
| L | Calcium adipate | 1.0 | None | Blue. |
| M | ......do............... | 1.0 | 0.5............... | None. |
| N | Calcium sebacate | 1.4 | None | Blue. |
| O | ......do............... | 1.4 | 0.5............... | Pale Yellow. |
| P | Disodium terephthalate | 1.4 | None | Blue. |
| Q | ......do............... | 1.4 | 0.5............... | Pale Yellow |

While it is not necessary to employ the alkanol derivative of ethylenediamine in combination with a hydrogen halide corrosion-inhibitor in order to overcome oxidative corrosion, it is usually advantageous to do so with polymeric materials containing halogen-including catalyst residues. If a hydrogen halide corrosion-inhibitor is not employed in such materials, the corrosion due to hydrogen halide corrodents is generally sufficiently severe to overcome the benefit of employing the oxidative-corrosion-inhibitor.

The corrosion-inhibiting compounds may be incorporated in compositions according to the present invention in various suitable ways including directly-blending the ingredients; mixing the ingredients on compounding rolls and the like; and dispersing the corrosion-inhibiting compound from liquid dispersion onto the polymer particles followed by evaporation of the liquid.

Since certain changes and modifications in the practice of the present invention can be entered into readily without departing substantially from its intended spirit and scope, it is to be fully understood that all of the foregoing description and specification be interpreted as merely being descriptive of certain of its preferred embodiments and not construed as being limiting or restrictive of the invention excepting as it is set forth and defined in the appended claims.

What is claimed is:

1. Non-corrosive composition comprising polyethylene prepared by polymerizing ethylene in the presence of a halogen-containing catalyst formed by admixing (1) a strong reducing agent selected from the group consisting of aluminum trialkyls, dialkyl aluminum halides, dialkyl aluminum hydrides and dialkyl aluminum alkoxides and (2) a compound selected from the group consisting of halogenides, oxyhalogenides, complex halogenides, freshly precipitated oxides, freshly precipitated hydroxides, alcoholates, acetates, benzoates and acetyl acetonates of the group IV-B, V-B and VI-B metals of the Mendelyeev periodic system, said polyethylene containing halogen-including catalyst residues after having been polymerized and as an oxidative-corrosion-inhibitor, between about 0.005 and 5 percent by weight, based on the weight of the composition, of a tetra-alkanol-substituted derivative of ethylene diamine in which each alkanol substituent consists of a monohydroxy alkyl group that contains not more than three carbon atoms therein.

2. The composition of claim 1 containing between about 0.5 and 2.0 percent by weight of the alkanol derivative of ethylenediamine.

3. The composition of claim 1 wherein the oxidative-corrosion-inhibitor is N,N,N',N'-tetrakis-(2-hydroxypropyl-)ethylenediamine.

4. The composition of claim 1 wherein the polyethylene is prepared by polymerizing ethylene in the presence of a catalyst formed by admixing an aluminum alkyl with titanium tetrachloride.

References Cited in the file of this patent

UNITED STATES PATENTS

| | | |
|---|---|---|
| 2,013,941 | Young et al. | Sept. 10, 1935 |
| 2,043,257 | Missbach | June 9, 1936 |
| 2,365,400 | Fikentscher | Dec. 19, 1944 |
| 2,432,586 | Quarles | Dec. 16, 1947 |
| 2,681,328 | Stanton et al. | June 15, 1954 |
| 2,834,768 | Friedlander | May 13, 1958 |

FOREIGN PATENTS

| | | |
|---|---|---|
| 533,362 | Belgium | May 16, 1955 |

OTHER REFERENCES

Gilman, Organic Chemistry, vol. 1, 2nd ed., 194., pages 489 and 490.